(12) United States Patent
Lee et al.

(10) Patent No.: US 9,294,469 B2
(45) Date of Patent: Mar. 22, 2016

(54) SYSTEMS AND METHODS FOR ESTABLISHING A CONNECTION BETWEEN AN APPLIANCE AND A HOME ENERGY MANAGEMENT DEVICE

(71) Applicant: General Electric Company, Schenectady, NY (US)

(72) Inventors: Dong Hun Lee, Gunpo-si (KR); Dong Soo Shin, Seoul (KR); Kevin Farrelly Nolan, Louisville, KY (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 13/934,340

(22) Filed: Jul. 3, 2013

(65) Prior Publication Data
US 2015/0013001 A1    Jan. 8, 2015

(51) Int. Cl.
*H04L 29/06* (2006.01)
(52) U.S. Cl.
CPC .................................. *H04L 63/0823* (2013.01)
(58) Field of Classification Search
None
See application file for complete search history.

(56) References Cited

U.S. PATENT DOCUMENTS

| | | | |
|---|---|---|---|
| 2005/0234568 A1* | 10/2005 | Chung | H04L 12/2827 700/90 |
| 2011/0046792 A1* | 2/2011 | Imes | F24F 11/0086 700/278 |
| 2011/0125337 A1* | 5/2011 | Zavadsky | G06F 1/263 700/291 |
| 2011/0202910 A1* | 8/2011 | Venkatakrishnan | G06Q 50/06 717/171 |
| 2012/0016974 A1* | 1/2012 | Bartholomay | H04L 41/5041 709/221 |
| 2012/0064923 A1* | 3/2012 | Imes | G05D 23/1919 455/457 |
| 2012/0083937 A1* | 4/2012 | Kong | G06Q 50/06 700/295 |
| 2012/0109394 A1* | 5/2012 | Takagi | G05B 15/02 700/291 |
| 2012/0147802 A1* | 6/2012 | Ukita | H04W 52/0277 370/311 |
| 2012/0296484 A1* | 11/2012 | Owens | H02J 3/14 700/295 |
| 2012/0297406 A1* | 11/2012 | Bartholomay | G06Q 30/0241 725/9 |
| 2012/0319491 A1* | 12/2012 | Borras | H02J 3/06 307/80 |
| 2013/0035884 A1* | 2/2013 | Burke | H02J 3/14 702/61 |
| 2013/0113822 A1* | 5/2013 | Putrevu | G09G 5/00 345/619 |
| 2013/0132008 A1* | 5/2013 | Borean | G01D 4/00 702/60 |
| 2013/0151012 A1* | 6/2013 | Shetty | G05D 23/1923 700/276 |
| 2013/0173807 A1* | 7/2013 | De Groot | G06Q 10/00 709/226 |

(Continued)

OTHER PUBLICATIONS

Suhonen et al., Unified Service Access for Wireless Sensor Networks, © 2012 IEEE.*

(Continued)

*Primary Examiner* — Jeffrey Pwu
*Assistant Examiner* — Baotram Tran
(74) *Attorney, Agent, or Firm* — Dority & Manning, P.A.

(57) ABSTRACT

The present disclosure provides systems and methods for establishing a connection between an appliance and a home energy management device. Upon being prompted by a user, the home energy management device can create a private network for a limited period of time. Then, upon also being prompted by the user, an appliance can request to join the private network. If the appliance satisfies any required security criteria, the home energy management device can securely provide local area network access data to the appliance over the private network. After receiving such access data, the appliance can connect to the wireless local area network and establish a secure connection with the home energy management device via a router of the local area network. In one implementation, both the home energy management device and the appliance can be prompted by the user by simply pressing a button or other user-operable selector.

14 Claims, 4 Drawing Sheets

(56) References Cited

U.S. PATENT DOCUMENTS

| | | | | |
|---|---|---|---|---|
| 2013/0232556 A1* | 9/2013 | Tan | ............... | H04L 63/08 726/4 |
| 2013/0278384 A1* | 10/2013 | McDowell | ............... | G08B 1/08 340/6.1 |
| 2013/0282196 A1* | 10/2013 | Tappeiner | ............... | G05B 13/02 700/295 |
| 2014/0025219 A1* | 1/2014 | Broniak | ............... | G06F 1/26 700/296 |

OTHER PUBLICATIONS

Ventyless Raj. S, Implementation Pervasive Computing Based High-Secure Smart Home System, © 1012 IEEE.*

Zhou et al., Security in User-Assisted Communications © 2007 IEEE.*

Nakazawa et al., A Pluggable Service-to-Service Communication Mechanism for Home Multimedia Networks © 2002 ACM.*

Kiyokawa et al., UbiRemote: Framework for Remotely Controlling Networked Appliances through Interaction with 3D Virtual Space, © 2010 ACM.*

Lai et al., An Intercommunication Home Energy Management System with Appliance Recognition in Home Network, © 2011, Springer Science+Business Media.*

Mizuno et al., A Mobile Phone Based Authentication Service for Home Appliances, © 2007 IEEE.*

* cited by examiner

SYSTEMS AND METHODS FOR ESTABLISHING A CONNECTION BETWEEN AN APPLIANCE AND A HOME ENERGY MANAGEMENT DEVICE

FIELD OF THE INVENTION

The present disclosure relates to home energy management systems. More particularly, the present disclosure relates to establishing a connection between an appliance and a home energy management device.

BACKGROUND OF THE INVENTION

Due to recent advancements in technology, infrastructure for energy delivery and systems for home energy management are increasingly including "smart" devices that are capable of intelligently communicating with each other over one or more networks. In particular, certain current home energy management systems can include a home energy management device which is able to receive instructions or requests from a user or a central utility facility and communicate with or control one or more smart appliances over a wireless local area network.

However, from the user's perspective, the increasing use of such smart devices can also increase the complexity of setting up and maintaining the home energy management system. For example, in order to introduce a new smart appliance to certain current home energy management systems, the user can be required to manually enter a network name (e.g. a service set identifier) and passcode associated with a wireless local area network available in their home. Remembering and entering the proper network name and passcode can be difficult, as such items can contain many characters, can be difficult to memorize due to their random nature, or can get lost over time.

For some appliances, entry of a network name and passcode must be performed using a complex user interface or display on the appliance. However, such a user interface can be unfamiliar or unwieldy for a novice user. Further, the inclusion of the user interface or display adds an additional manufacturing cost and can result in higher consumer prices.

Therefore, enhanced systems and methods for establishing a connection between an appliance and a home energy management device are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to an appliance. The appliance includes a processor, a memory, and a network interface. The appliance is configured to connect to a local area network by performing operations including connecting to a private network created by a home energy management device and receiving access data from the home energy management device over the private network. The access data provides information required for connection to the local area network. The appliance uses the access data to connect to the local area network.

Another aspect of the present disclosure is directed to a home energy management device. The home energy management device includes a processor, a memory, and a network interface. The home energy management device is configured to perform operations including creating a private network and receiving from an appliance a request to connect to the private network. The home energy management device is configured to allow the appliance to connect to the private network when the appliance satisfies a security criterion. The home energy manager transmits to the appliance over the private network access data providing information required for access to a local area network. The home energy management device is further configured to terminate the private network.

Another aspect of the present disclosure is directed to a method for connecting an appliance to a home energy management device. The method includes receiving at the home energy management device a first user prompt and, responsive to the first user prompt, creating a private network using the home energy management device. The method also includes receiving at the appliance a second user prompt and, responsive to the second user prompt, sending from the appliance to the home energy management device a first request to join the private network. The method includes establishing a first connection between the appliance and the home energy management device over the private network. The method further includes sending from the home energy management device to the appliance over the private network access data providing information for connecting to a local area network. The method includes terminating the private network.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
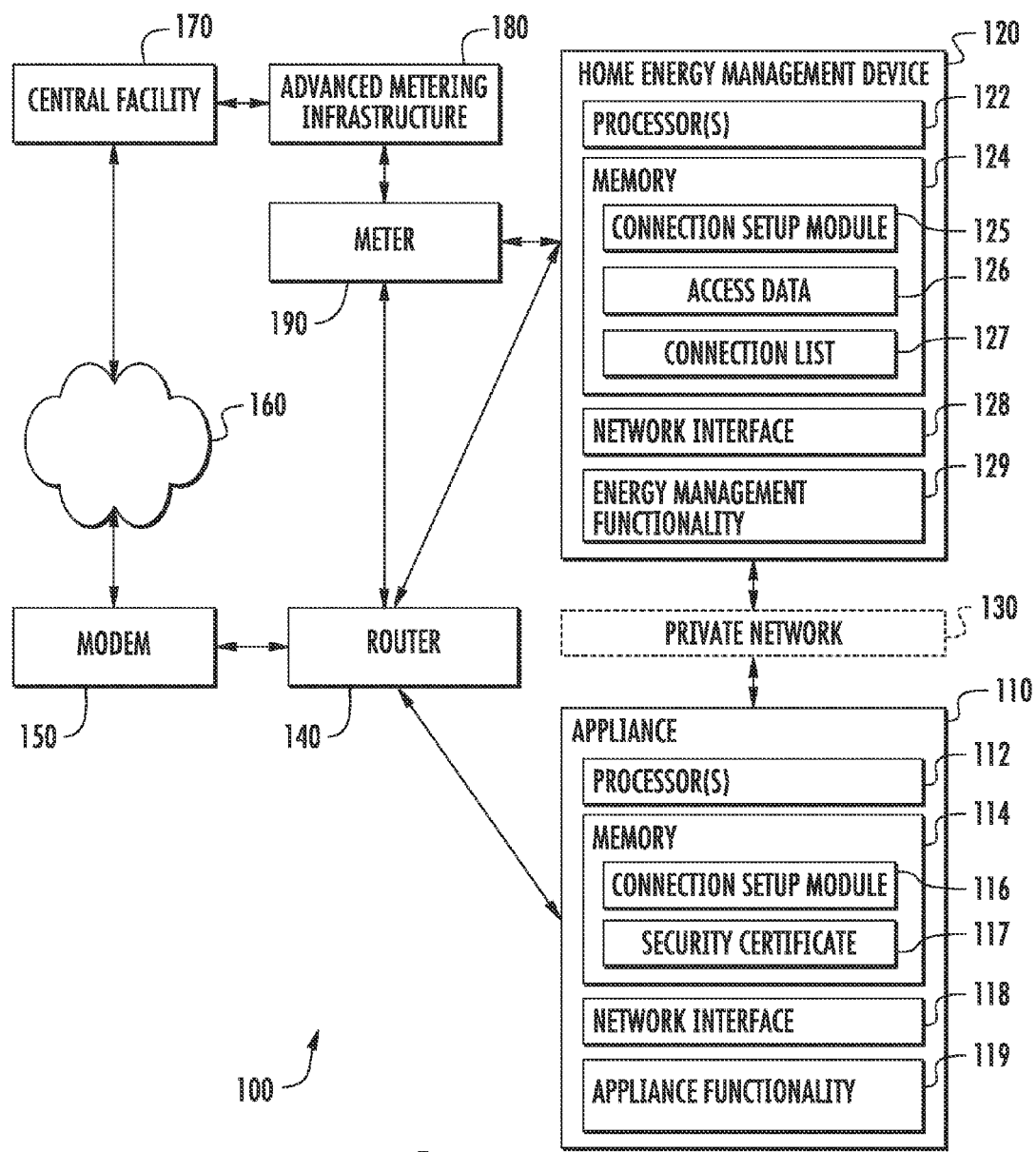
FIG. 1 depicts an exemplary energy management system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for establishing a connection between an appliance and a home energy management device. According to aspects of the present disclosure, the home energy management device can act as both a network provisioning center and a trust center. More particularly, upon being prompted by a user, the home energy management device can create a private network for a limited period of time. Then, upon also being prompted by the user, an appliance can request to join the private network. If the appliance satisfies any required security criteria, the home energy management device can securely provide local area network access data to the appliance over the private network. After receiving such access data, the appliance can connect to the wireless local area network and establish a secure connection with the home energy management device via a router of the local area network. In one implementation, both the home energy management device and the appliance can be prompted by the user by simply pressing a button or other user-operable selector.

Further aspects of the present disclosure relate to various implementations of the present disclosure, including implementations that employ various security mechanisms, connection protocols, network standards, or other suitable variations.

With reference now to the FIGS., exemplary embodiments of the present disclosure will now be discussed in detail. FIG. 1 depicts an exemplary energy management system 100 according to an exemplary embodiment of the present disclosure. Energy management system 100 includes an appliance 110 and a home energy management device 120.

Appliance 110 can include one or more processors 112, a memory 114, and a network interface 118, and can provide appliance functionality 119. As used herein, an appliance can be any machine or device for performing a specific task, including, without limitation, an air conditioner, an HVAC system controller, a security system, a camera, a ceiling fan, a clothes dryer, a clothes washer, a stereo system, a dishwasher, an energy delivery system, a refrigerator, a heater, a lighting system, a stove, an oven, a smoke detector, a television, a thermostat, a water heater, a humidity or temperature control device, an ice maker, a garbage disposal, a renewable energy system, an energy storage system, or any other suitable appliance.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions that can be executed by processor(s) 112 to control various components of appliance 110 to provide appliance functionality 119.

According to an aspect of the present disclosure, processor(s) 112 can implement a connection setup module 116 included in memory 114 in order to establish a connection between appliance 110 and home energy management device 120. For example, in one embodiment, appliance 110 can implement connection setup module 116 to perform the appliance portions of exemplary method (200) of FIG. 2 and exemplary method (300) of FIG. 3.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

Returning to FIG. 1, memory 114 of appliance 110 can also store a security certificate 117. For example, security certificate 117 can serve to verify the identity of appliance 110. As an example, security certificate 117 can be issued by the manufacturer to appliance 110 at the time of manufacture and stored in memory 114, such as firmware. Security certificate 117 can be issued or formatted according to any suitable security protocol, including various forms of public-key infrastructure. Thus, in some implementations, security certificate 117 can both indicate the identity of appliance 110 and provide a public key for encryption use by another device. While the term "certificate" has been used here for the purpose of explanation, it should be appreciated that other forms of security data or identity data can be stored in memory 114 in addition to or in place of security certificate 117.

Network interface 118 can include any suitable components for interfacing with one more networks, including for example, transmitters, receivers, ports, controllers, antennas, or other suitable components.

Home energy management device 120 can include one or more processors 122, a memory 124, and a network interface 128, and can provide energy management functionality 129. Home energy management device 120 can be any device or combination of devices that allow for energy management functionality 129, such as viewing or analyzing energy consumption data, regulating appliance runtime, responding to or acting upon demand requests from a utility provider, providing out-of-range user control of appliances, enabling inter-appliance communication, or other energy management functionality.

As an example, home energy management device 120 can be a stand-alone device that plugs into a wall socket and wirelessly communicates with any smart appliances over a local area network. As another example, home energy management device 120 can be a computing device such as a general purpose computer, smartphone, PDA, laptop, tablet, mobile device, or other suitable computing device implementing a home energy management application. As yet another example, home energy management device 120 can be implemented as a component or feature of a smart meter.

It should also be appreciated that while the present disclosure is particularly directed to home energy management, the present disclosure can also be applied to energy management for other facilities, including, without limitation, commercial and public facilities whose energy demand may also be controlled or monitored by an energy management device. Thus in the context of the present disclosure, the use of the terms "home" or "house" is fully intended to include other structures whether used as a residential facility or for some other purpose.

The processor(s) 122 can be any suitable processing device, such as a microprocessor, microcontroller, integrated circuit, or other suitable processing device. The memory 124 can include any suitable computing system or media, including, but not limited to, non-transitory computer-readable media, RAM, ROM, hard drives, flash drives, or other memory devices. The memory 124 can store information accessible by processor(s) 122, including instructions that can be executed by processor(s) 122 to provide energy management functionality 129.

Network interface 128 can include any suitable components for interfacing with one more networks, including for example, transmitters, receivers, ports, controllers, antennas, or other suitable components.

According to an aspect of the present disclosure, processor(s) 122 can implement a connection setup module 125 included in memory 124 in order to establish a connection between home energy management device 120 and appliance 110. For example, in one embodiment, home energy management device 120 can implement connection setup module 125 to perform the home energy management device portions of exemplary method (200) of FIG. 2 and exemplary method (300) of FIG. 3 and to perform exemplary method (400) of FIG. 4.

Home energy management device 120 can also store access data 126 in memory 124. More particularly, as will be discussed further with respect to FIG. 2, access data 126 can be stored by home energy management device 120 and provided to an appliance 110 upon request. Access data 126 can include data required for connection to a local area network (LAN), including, for example, a LAN service set identifier (SSID), a LAN passcode, a LAN security type, or other suitable access data. Access data 126 can also include home energy management device-specific information, such as a device installation code, a device IP address, device software version, or other suitable information.

A connection list 127 can also be included in memory 124. Connection list 127 can store information concerning any appliance 110 to which home energy management device 120 has previously been successfully connected. For example, connection list 127 can store sufficient information so that home energy management device 120 can reconnect any previously connected appliances in the event of a network reset or recovery from failure.

Energy management system 100 can further include a router 140 which provides routing and serves as a wireless access point for a wireless local area network. Router 140 can provide access to the internet 160 via a modem 150. One of skill in the art will appreciate the structure, capabilities, and operation of router 140 and modem 150.

Home energy management device 120 can be connected to the local area network by way of communication with router 140. For example, access data 126 can be manually entered into home energy management device 120, stored in memory 124, and then used to connect to router 140 using network interface 128. As another example, home energy management device 120 can be physically connected with router 140, for example, by way of an Ethernet cable, and access data 126 can be automatically read or provided without requiring manual entry. After such automatic acquisition of access data 126, home energy management device 120 can be physically disconnected and thereafter connect to the local area network and communicate with router 140 wirelessly.

Energy management system 100 can further include a utility provider central facility 170, advanced metering infrastructure 180, and a meter 190. Central facility 170 can be in communication with home energy management device 120 in two different ways. For example, central facility 170 can engage in bi-directional communication with home energy management device 120 by way of internet 160, modem 150, and router 140. As an example, such communication can include demand response communications or other smart grid communications.

Alternatively or additionally, in some embodiments, central facility 170 can engage in bidirectional communication with home energy management device 120 by way of advanced metering infrastructure (AMI) 180 and meter 190. AMI 180 can correspond to a vast number of devices including transmission lines over which power and possibly communications signals may flow to a large number of individual homes and other facilities or locations. AMI 180 can also include various communications related features including wireless communications or power line communications systems that may be employed to exchange information relating to consumption and control of utilities between individual homes, such as meter 190, or other locations and central facility 170.

Meter 190 can be a smart meter and can communicate with home energy management device 120 using a variety of communication protocols. For example, meter 190 can communicate directly with home energy management device 120 using Bluetooth, Zigbee, or other suitable protocols, including general RF communication. Alternatively or additionally, meter 190 can communicate with home energy management device 120 via router 140.

According to an aspect of the present disclosure, home energy management device 120 can be configured to generate a private network 130. Appliance 110 can connect to private network 130 and can securely receive access data 126 from home energy management device 120 over private network 130. Appliance 110 can then use the received access data 126 to connect to the local area network and communicate with home energy management device 120 via router 140.

Private network 130 can provide network communications according to any suitable protocol. For example, private network 130 can be a Wi-fi Direct network, a Bluetooth network, a Zigbee network, short-range radio communication network, or any other suitable form of private network.

Figure 2:
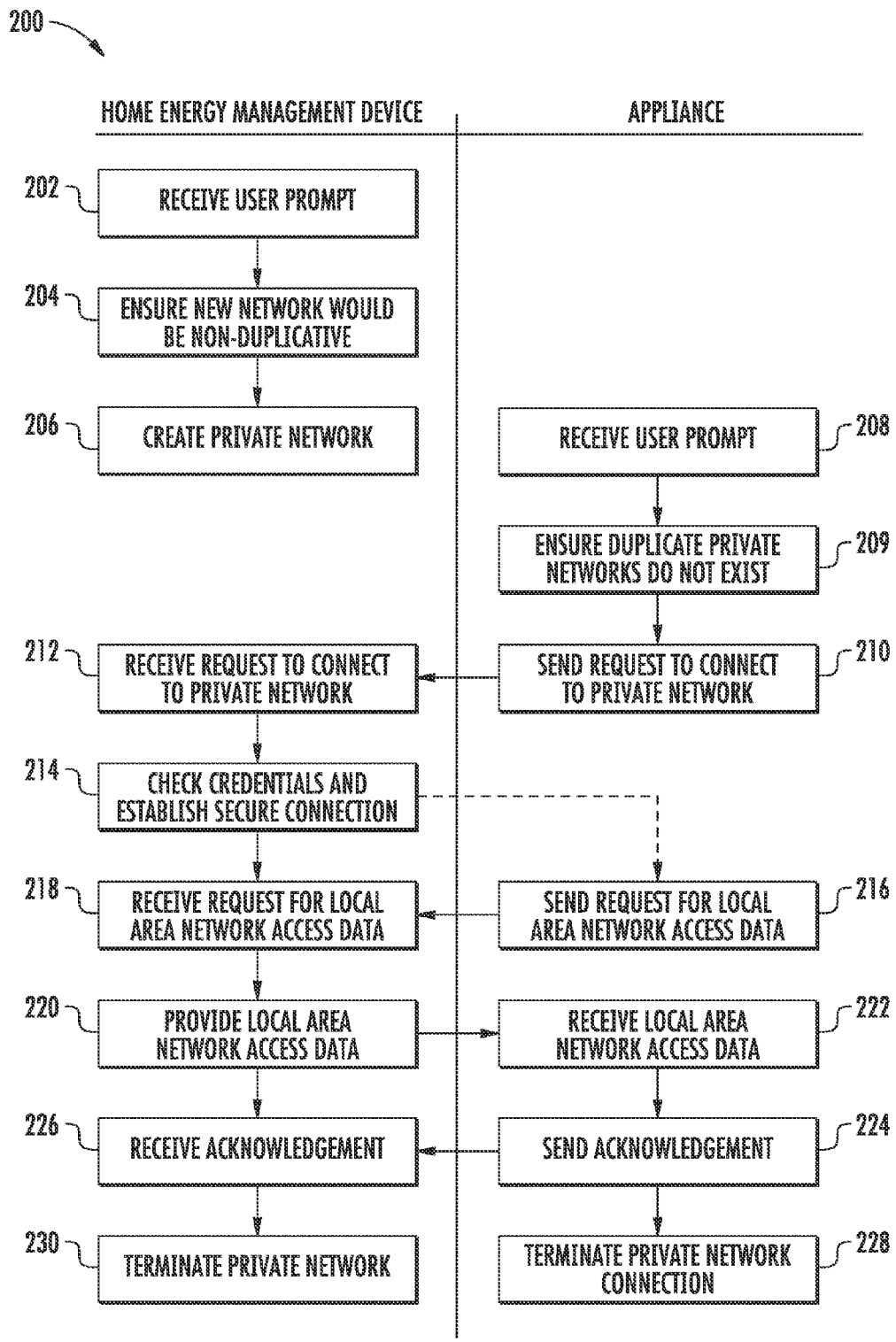
FIG. 2 depicts a flow diagram of an exemplary method for providing local area network access data to an appliance.

FIG. 2 depicts a flow diagram of an exemplary method (200) for providing local area network access data to an appliance. Method (200) can be implemented using any suitable system, including, for example, home energy management device 120 and appliance 110 of energy management system 100 of FIG. 1. In addition, FIG. 2 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (202) a home energy management device receives a user prompt. For example, the home energy management device can include a user-operable selector that, when operated by a user, serves as a prompt to the home energy management device to perform the appropriate portions of method (200). The user-operable selector can be a push button, touch-sensitive button, switch, knob, voice-command, or other suitable means of selection. Generally, the user operates the selector at (202) and the home energy management device is prompted to begin.

At (204) the home energy management device ensures that a new private network would be non-duplicative. In particular, duplicative networks should be avoided so that devices or appliances from multiple homes do not become cross-synced or obtain another's confidential access data. As an example, at (204) the home energy management device can determine whether any other private networks are currently operating which employ the same or an interfering protocol. As another example, the home energy management device can scan available networks for one or more criteria that indicate that an existing private network was created by another home energy management device from the same manufacturer. An error indication such as a light or sound can be provided by the home energy management device if the new network would be duplicative.

If it is determined at (204) that new private network would be non-duplicative, then at (206) the home energy management device creates the private network. The private network created at (206) can be a Wi-fi Direct network, a Bluetooth network, a Zigbee network, short-range radio communication network, or any other suitable form of private network.

At (208) an appliance receives a user prompt. For example, the appliance can include a user-operable selector that, when operated by a user, serves as a prompt to the appliance to perform the appropriate portions of method (200). The user-operable selector can be a push button, touch-sensitive button, switch, knob, voice-command, or other suitable means of selection. Generally, the user operates the selector at (208) and the appliance is prompted to begin.

At (209) the appliance ensures that duplicate private networks do not exist. In particular, duplicate networks should be avoided so that the appliance does not become cross-synced or obtain another's confidential access data. As an example, at (209) the appliance can determine whether two or more private networks are currently operating which employ the same or an interfering protocol. As another example, the appliance can scan available networks for one or more criteria that indicate that two or more private networks have been created by home energy management devices from the same manufacturer. An error indication such as a light or sound can be provided by the appliance if two or more conflicting private networks are detected. Otherwise, the appliance can continue to (210).

At (210) the appliance sends a request to the home energy management device over the private network requesting to connect to the private network. For example, the appliance can recognize the private network based on an indicator included in the private network service set identifier (SSID), such as, for example, a set string of characters provided at the beginning of every private network created by compatible home energy management devices.

In some implementations, the request sent at (210) includes a security certificate that indicates the identity of the appliance and contains a public key. However, other security or identity data can be used in addition or alternatively to a security certificate.

At (212) the home energy management device receives the request to join the private network from the appliance. At (214) the home energy management device checks any required security credentials and establishes a secure connection between the device and the appliance. As an example, in one embodiment, the home energy management device can communicate with the appliance manufacturer over the Internet in order to validate a security certificate provided by the appliance at (210). As another example, the home energy management device can simply analyze any provided security data to ensure satisfactory security credentials without contacting a third party.

At (216) the appliance sends over the private network a request for local area network (LAN) access data. At (218) the home energy management device receives the request for the LAN access data.

At (220) the home energy management device provides the LAN access data to the appliance over the private network. Generally, the provided access data should include sufficient information for a connection to be established to a router of the LAN. For example, the access data can include a LAN network name or SSID and a LAN passcode. Further information that can optionally be provided as access data includes, without limitation, a LAN security type and/or home energy management device-specific information, such as a device IP address, a device installation code, a device software version, or any other suitable information.

At (222) the appliance receives the access data from the home energy management device. At (224) the appliance sends an acknowledgement of receipt (ACK). At (226) the home energy management device receives the acknowledgement.

At (228) that appliance terminates its private network connection. Alternatively or additionally, at (230) the home energy management device terminates the private network.

In such fashion, a user can quickly, easily, and securely provide LAN access data to an appliance that desires to be connected with a home energy management system employing a wireless local area network, without having to manually enter the LAN information into the appliance. Further, any communications from the home energy management device to the appliance can be encrypted according to a public key provided by the appliance and vice versa.

Figure 3:
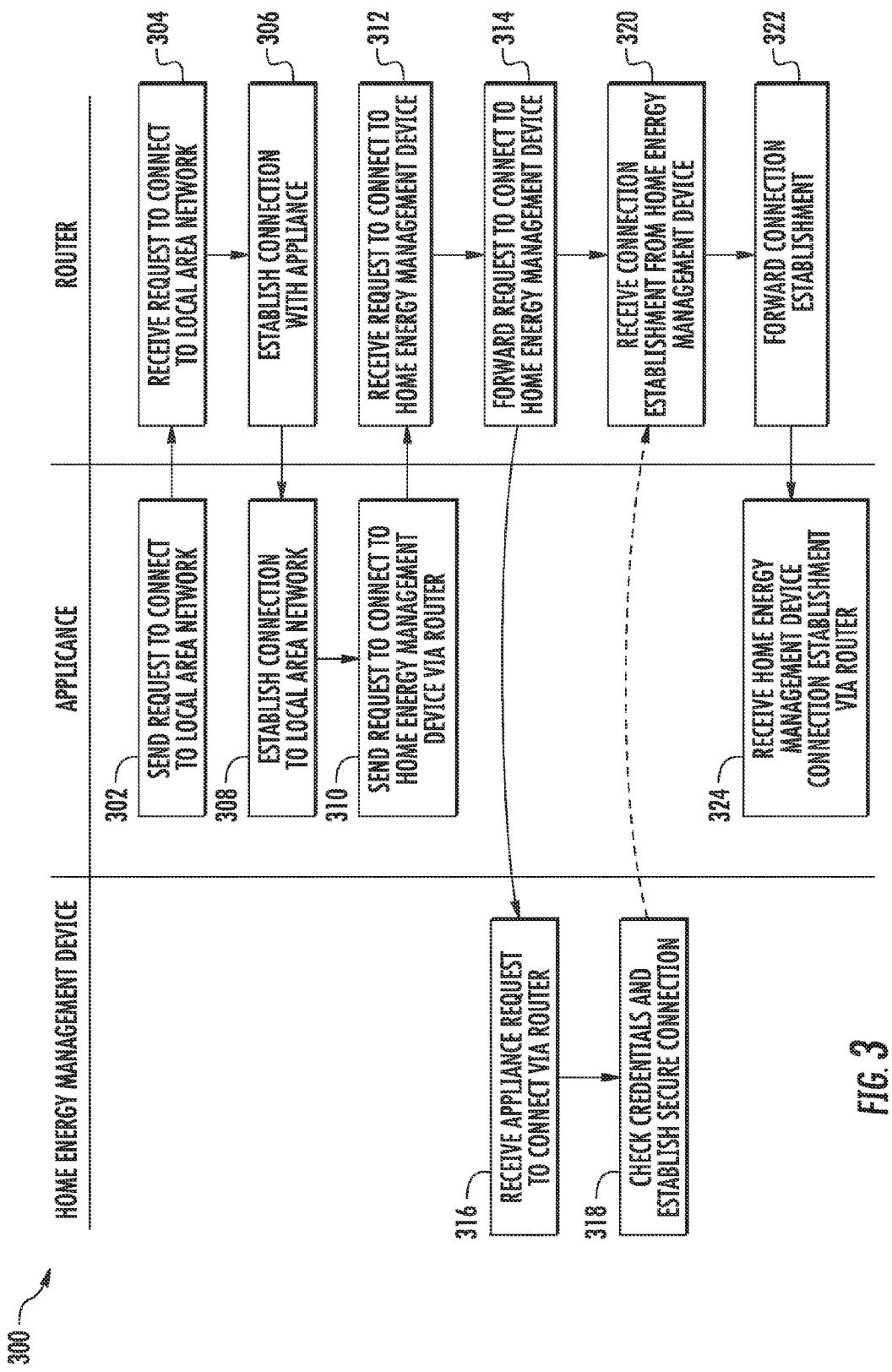
FIG. 3 depicts a flow diagram of an exemplary method for connecting an appliance to a home energy management device according to an exemplary embodiment of the present disclosure.

FIG. 3 depicts a flow diagram of an exemplary method (300) for connecting an appliance to a home energy management device according to an exemplary embodiment of the present disclosure. Method (300) can be implemented using any suitable system, including, for example, home energy management device 120, appliance 110, and router 140 of energy management system 100 of FIG. 1. In addition, FIG. 3 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (302) an appliance sends to a router a request to connect to a local area network. In particular, the request sent at (302) can include access data such as a LAN passcode received by the appliance from a home energy management device over a private network, for example, according to method (200) of FIG. 2. At (304) the router receives the request to connect to the local area network.

At (306) the router establishes a connection with the appliance. In particular, the router establishes the connection at (306) only if the LAN passcode included in the request sent at (302) is satisfactory for entry into the local area network. At (308) the appliance establishes the connection with the local area network.

At (310) the appliance sends a request to connect to the home energy management device via the router. For example, any suitable addressing scheme can be used such that the request is received by the router at (312) and forwarded to the home energy management device at (314). At (316) the home energy management device receives from the router the appliance's request to connect.

At (318) the home energy management device checks for any required credentials and establishes a secure connection with the appliance via the router. In particular, the request sent by the appliance at (310) can include security data that can be checked by the home energy management device at (318).

As an example, the security data included in the request sent at (310) can be a security certificate stored in the appliance memory. For example, the security certificate can be issued by the manufacturer as part of a public key infrastructure and the home energy management device can contact a validation authority, such as the appliance or device manufacturer, over the Internet via the LAN to validate the certificate. Alternatively, the home energy management device can simply analyze any provided certificate to ensure satisfactory security credentials without contacting any third party.

As another example, the request sent at (310) can include a security code generated from home energy management device-specific information, such as a device IP address, a device installation code, a device software version, or any other suitable information. For example, the home energy management device can have previously transmitted the device-specific information to the appliance over a private network, for example, at (220) of method (200) of FIG. 2. The appliance can be configured to use such device-specific information as a seed to generate the security code according to any known seeding algorithm. Such security code can be included in the request sent by the appliance at (310) and can be checked by the home energy management device at (318). Thus, the home energy management device can be configured to properly validate the provided security code.

At (320) the router receives the connection establishment from the home energy management device. In particular, the connection establishment received at (320) can have any suitable addressing such that the connection establishment is forwarded by the router at (322) and received at the appliance at (324).

In such fashion, an appliance that has previously received LAN access data can quickly establish a secure connection with the home energy management device using a router of the LAN. Thereafter, any desired communication between the home energy management device and the appliance can be securely transmitted over the LAN via the router. Further, any communications from the home energy management device to the appliance can be encrypted according to a public key previously provided by the appliance and vice versa.

Figure 4:
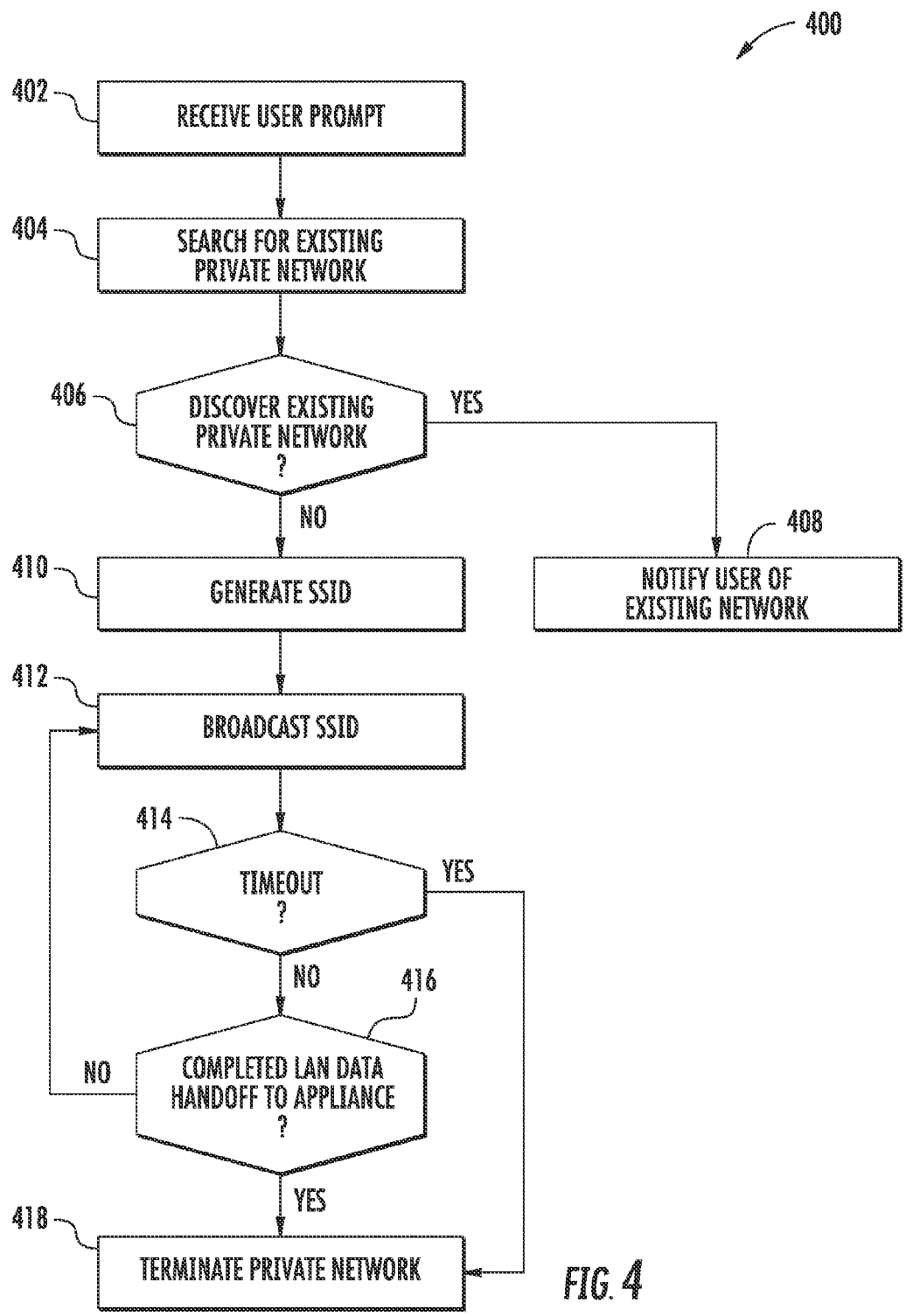
FIG. 4 depicts a flow diagram of an exemplary method for creating a private network according to an exemplary embodiment of the present disclosure.

FIG. 4 depicts a flow diagram of an exemplary method (400) for creating a private network according to an exemplary embodiment of the present disclosure. Method (400) can be implemented using any suitable system, including, for example, home energy management device 120 of energy management system 100 of FIG. 1. In addition, FIG. 4 depicts steps performed in a particular order for purposes of illustration and discussion. Those of ordinary skill in the art, using the disclosures provided herein, will understand that the various steps of any of the methods disclosed herein can be omitted, adapted, and/or rearranged in various ways.

At (402) a user prompt is received. For example, a push button, switch, or other user-operable selector can be operated by a user and can provide a prompt to implement method (400).

At (404) a search is conducted for existing private networks. In particular, duplicative networks should be avoided so that devices or appliances from multiple homes do not become cross-synced or obtain another's confidential access data. As an example, at (404) it can be determined whether any other private networks are currently operating which employ the same or an interfering protocol. As another example, available networks can be scanned for one or more criteria that indicate that an existing private network was created by another home energy management device from the same manufacturer, such as, for example, a set string of characters provided at the beginning of every private network created by another device from the same manufacturer. At (406) it is determined whether another conflicting private network exists.

If it is determined at (406) that another conflicting private network exists, then at (408) the user can be notified that there is an existing network. For example, an error indication such as a light or sound can be provided. The user can then wait a period of time for the conflicting private network to expire, timeout, or otherwise terminate and then begin method (400) again by operating the prompt selector.

However, if it determined at (406) that another conflicting private network does not exist then at (410) a private network service set identifier (SSID) is generated. Any suitable algorithm for generating an SSID can be used. As an example, in one embodiment, a time seeded key generator can be used to generate the private network SSID. As another example, other information can be inputted into a key generator, such as device-specific information or some combination thereof. In addition, a set string of characters can be used as a prefix for the private network SSID such that appliances are able to more easily locate the proper private network.

At (412) the private network SSID is broadcasted so that any appliances that are attempting to connect are able to identify the proper private network.

At (414) it is determined whether the private network has timed out. For example, a home energy management device can be configured to create and hold open the private network for only a limited period of time, such as, for example, one minute. After the determined period of time the network is timed out. If it is determined at (414) that the private network has been held open for longer than the determined period of time, then method (400) proceeds to (416) and the private network is terminated.

However, if it is determined at (414) that the private network has not timed out, then it is determined at (416) whether LAN access data has successfully been handed off to an appliance. For example, an appliance can connect to the private network and request and receive LAN access data. After a successful handoff of such data, the private network should be closed.

Thus, if it is determined at (416) that a LAN access data handoff has been completed, then method (400) proceeds to (418) and terminates the private network. However, if it is determined at (416) that a successful LAN access data handoff has not been completed, then the method returns to (412) and the private network SSID continues to be broadcasted.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
a processor;
a memory; and
a network interface;
wherein the appliance is configured to connect to a local area network by performing operations, the operations comprising:
prior to connecting to the local area network, connecting to a private network created by a home energy management device, the private network being created by generating a service set identifier and broadcasting the service set identifier for a predetermined period of time, wherein connecting to the private network created by the home energy management device comprises providing a security certificate to the home energy management device, the security certificate having been stored in the memory of the appliance;
receiving access data from the home energy management device over the private network, the access data comprising a local area network service set identifier and a local area network passcode required for connection to the local area network, and device information concerning the home energy management device, wherein the device information comprises one or more of a device internet protocol (IP) address, a device installation code, or a device software version;

terminating the connection with the private network;

using the access data to connect to the local area network; and responsive to connecting to the local area network, establishing a connection with the home energy management device over the local area network by:

sending via a router of the local area network a request to connect to the home energy management device; and receiving via the router connection establishment data from the home energy management device.

2. The appliance of claim 1, further comprising a user-operable selector that, when operated by a user, prompts the appliance to initiate the operations for connecting to the local area network.

3. The appliance of claim 1, wherein connecting to the private network created by the home energy management device comprises:

detecting the private network created by the home energy management device based on an indicator included in a service set identifier of the private network; and requesting to connect to the private network.

4. The appliance of claim 1, wherein using the access data to connect to the local area network comprises:

identifying the local area network based on the local area network service set identifier;

sending to a router a request to connect to the local area network, the request including the local area network passcode; and establishing via the router a connection to the local area network.

5. The appliance of claim 1, wherein:

the access data received from the home energy management device includes device information concerning the home energy management device; and the appliance is further configured to use the device information as a seed for a security code included in the request to connect to the home energy management device sent via the router.

6. A home energy management device comprising:
a processor;
a memory; and
a network interface;
wherein the home energy management device is configured to perform operations, the operations comprising:
creating a private network by:
determining whether a second network currently exists, the second network employing the same communication standard as the private network;
generating a service set identifier for the private network when the second network does not exist; and
broadcasting the service set identifier of the private network for a predetermined period of time;
receiving from an appliance a request to connect to the private network, the request to connect to the private network received from the appliance including a security certificate;
allowing the appliance to connect to the private network when the security certificate is validated;
transmitting to the appliance over the private network access data providing information required for access to a local area network, the access data comprising a local area network service set identifier, a local area network passcode, and device information concerning the home energy management device, wherein the device information comprises one or more of a device internet protocol (IP) address, a device installation code, or a device software version;

terminating the private network at the expiration of the predetermined period of time;

receiving via a router of the local area network a request from the appliance to connect to the home energy management device; and sending via the router connection establishment data to the appliance.

7. The home energy management device of claim 6, further comprising a user-operable selector that, when operated by a user, prompts the home energy management device to create the private network.

8. The home energy management device of claim 6, wherein creating a private network further comprises providing a notification to a user when the second network exists.

9. The home energy management device of claim 6, wherein creating a private network comprises generating a service set identifier for the private network using a time seeded key generator.

10. The home energy management device of claim 6, being further configured to establish a connection with the appliance over the local area network, wherein the device information concerning the home energy management device is used as a seed for a security exchange between the home energy management device and the appliance that occurs over the local area network.

11. The home energy management device of claim 6, being further configured to perform further operations comprising:

establishing a connection with the appliance over the local area network; and storing information identifying the appliance in the memory such that the home energy management device can reestablish the connection with the appliance over the local area network in the event of a network reset or failure recovery.

12. The home energy management device of claim 6, wherein the home energy management device comprises a mobile computing device implementing a home energy management application.

13. A method for connecting an appliance to a home energy management device, the method comprising:

receiving, at the home energy management device, a first user prompt;

responsive to the first user prompt, creating a temporary private network for a predetermined period of time using the home energy management device;

receiving, at the appliance, a second user prompt;

responsive to the second user prompt, sending from the appliance to the home energy management device a first request to join the private network, the first request to join the private network including an appliance security certificate;

establishing a first connection between the appliance and the home energy management device over the private network;

sending from the home energy management device to the appliance over the private network access data providing information for connecting to a local area network, the access data comprising a local area network service set identifier, a local area network passcode, and device information concerning the home energy management device, wherein the device information comprises one or more of a device internet protocol (IP) address, a device installation code, or a device software version;

terminating the private network at the expiration of the predetermined period of time;

sending from the appliance to a router a second request to connect to the local area network, the second request including at least a portion of the access data and a security code generated based at least in part on the access data; and establishing a second connection between the appliance and the home energy management device over the local area network, wherein establishing the second connection comprises performing at least one security routine to validate the security code.

14. The method of claim 13, wherein:

establishing the second connection comprises performing at least one security routine in which the one or more of the device IP address, the device installation code, or the device software version comprises a setup seed.

* * * * *